US010656497B1

(12) United States Patent
Lentz

(10) Patent No.: US 10,656,497 B1
(45) Date of Patent: May 19, 2020

(54) POLARIZATION SCENE PROJECTOR

(71) Applicant: Government of the United States, as represented by the Secretary of the Air Force, Wright-Patterson AFB, OH (US)

(72) Inventor: Joshua Lentz, Niceville, FL (US)

(73) Assignee: The Government of the United States as Represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/268,980

(22) Filed: Feb. 6, 2019

(51) Int. Cl.
*G02F 1/29* (2006.01)
*G03B 21/20* (2006.01)

(52) U.S. Cl.
CPC ............. *G02F 1/292* (2013.01); *G03B 21/20* (2013.01); *G03B 21/2073* (2013.01); *G02F 2203/22* (2013.01); *G02F 2203/24* (2013.01)

(58) Field of Classification Search
CPC ..... G03B 21/2073; G03B 21/20; G02F 1/292; G02F 2203/24; G02F 2203/22
See application file for complete search history.

(56) References Cited

U.S. PATENT DOCUMENTS

| | | | |
|---|---|---|---|
| 5,300,942 A | 4/1994 | Dolgoff | |
| 5,459,593 A | 10/1995 | Ootaki | |
| 5,602,679 A | 2/1997 | Dolgoff et al. | |
| 5,691,785 A | 11/1997 | Usui et al. | |
| 5,900,982 A | 5/1999 | Dolgoff et al. | |
| 6,147,735 A | 11/2000 | Tamazaki et al. | |
| 6,392,689 B1 | 5/2002 | Dolgoff | |
| 6,624,862 B1 | 9/2003 | Hayashi et al. | |
| 6,746,122 B2 | 6/2004 | Knox | |
| 7,175,279 B2 | 2/2007 | Drazic et al. | |

(Continued)

FOREIGN PATENT DOCUMENTS

| | | |
|---|---|---|
| WO | WO9215082 | 9/1992 |
| WO | WO2005094070 | 10/2005 |

OTHER PUBLICATIONS

Komanduri, Ravi K., et al., "Reflective Liquid Crystal Polarization Gratings with High Efficiency and Small Pitch," Proc. SPIE 7050, Liquid Crystals XII, 70500J (Aug. 28, 2008).

(Continued)

*Primary Examiner* — Bao-Luan Q Le
(74) *Attorney, Agent, or Firm* — AFMCLO/JAZ

(57) ABSTRACT

A scene projector includes a first cycloidal diffractive waveplate (CDW) having first pixels that are switchable such that light from a zero order passes through along an optical axis and light from plus and minus first orders is deflected away from the optical axis, and a second CDW downstream of the first CDW that includes second pixels positioned to receive diffracted orders of light from the first CDW, where there are at least three second pixels for one first pixel corresponding to each diffracted order received from the first pixel. The scene projector may further include a first reflective surface and a second reflective surface each positioned to receive diffracted orders of light from the second CDW, where each reflective surface directs light toward a grating structure. The scene projector may independently control a degree of polarization, angle of linear polarization, and intensity for light output therefrom.

20 Claims, 7 Drawing Sheets

(56) References Cited

U.S. PATENT DOCUMENTS

| | | |
|---|---|---|
| 7,192,139 B2 | 3/2007 | Drazic et al. |
| 7,316,481 B2 | 1/2008 | De Vaan |
| 7,431,460 B2 | 10/2008 | Hall, Jr. et al. |
| 7,710,849 B2 * | 5/2010 | Katayama ............ G11B 7/1353 369/112.05 |
| 7,916,392 B2 | 3/2011 | Nakagawa et al. |
| 8,305,523 B2 | 11/2012 | Escuti et al. |
| 8,358,400 B2 | 1/2013 | Escuti |
| 8,537,310 B2 * | 9/2013 | Escuti ............... G02F 1/133504 349/201 |
| 8,610,853 B2 | 12/2013 | Escuti |
| 8,998,417 B2 | 4/2015 | Yanai |
| 9,195,092 B2 * | 11/2015 | Escuti ............... G02F 1/133528 |
| 9,715,048 B2 | 7/2017 | Tabirian et al. |
| 10,423,045 B2 * | 9/2019 | Roberts ................ G02B 5/3016 |
| 2005/0274870 A1 * | 12/2005 | Katayama ............ G11B 7/1353 250/201.5 |
| 2007/0216872 A1 | 9/2007 | Hall |
| 2007/0229718 A1 | 10/2007 | Hall |
| 2010/0245689 A1 | 9/2010 | Masuda |
| 2011/0242461 A1 * | 10/2011 | Escuti ............... G02F 1/133504 349/96 |
| 2012/0081674 A1 | 4/2012 | Okuda |
| 2013/0335683 A1 * | 12/2013 | Escuti ............... G02F 1/133528 349/96 |
| 2017/0139203 A1 | 5/2017 | Tabirian et al. |
| 2018/0136535 A1 * | 5/2018 | Roberts ............. G02B 27/0916 |

OTHER PUBLICATIONS

Escuti, M., et al., "39.4: Polarization-Independent Switching with High Contrast from a Liquid Crystal Polarization Grating," SID Symposium Digest of Technical Papers, vol. 37, Issue 1, pp. 1443-1446 (Jun. 2006).

F. Gori, "Measuring Stokes Parameters by Means of a Polarization Grating," Opt. Lett. 24, 584-86 (1999).

J. Tervo and J. Turunen, "Paraxial-Domain Diffractive Elements with 100% Efficiency based on Polarization Gratings," Opt. Lett. 25, 785-86 (2000).

Serak, S., et al., "Diffractive Waveplate Arrays [Invited]," J. Opt. Soc. Am. B 34, B56-B63 (2017).

Kim, J., et al., "Efficient and Monolithic Polarization Conversion System based on a Polarization Grating," Appl. Opt. 51, 4852-57 (2012).

Hamaoui, M., "Polarized Skylight Navigation," Appl. Opt. 56, B37-B46 (2017).

Nersisyan, S., et al., "Polarization Insensitive Imaging through Polarization Gratings," Opt. Express 17, 1817-30 (2009).

S. R., Nersisyan, et al., "The Principles of Laser Beam Control with Polarization Gratings Introduced as Diffractive Waveplates," Proceedings of the SPIE, vol. 7775, id. 77750U (2010).

Nersisyan, S. R., et al., "Optical Axis Gratings in Liquid Crystals and their Use for Polarization Insensitive Optical Switching," J. of Nonlinear Optical Physics and Materials, vol. 18, Issue 01, pp. 1-47 (2009).

\* cited by examiner

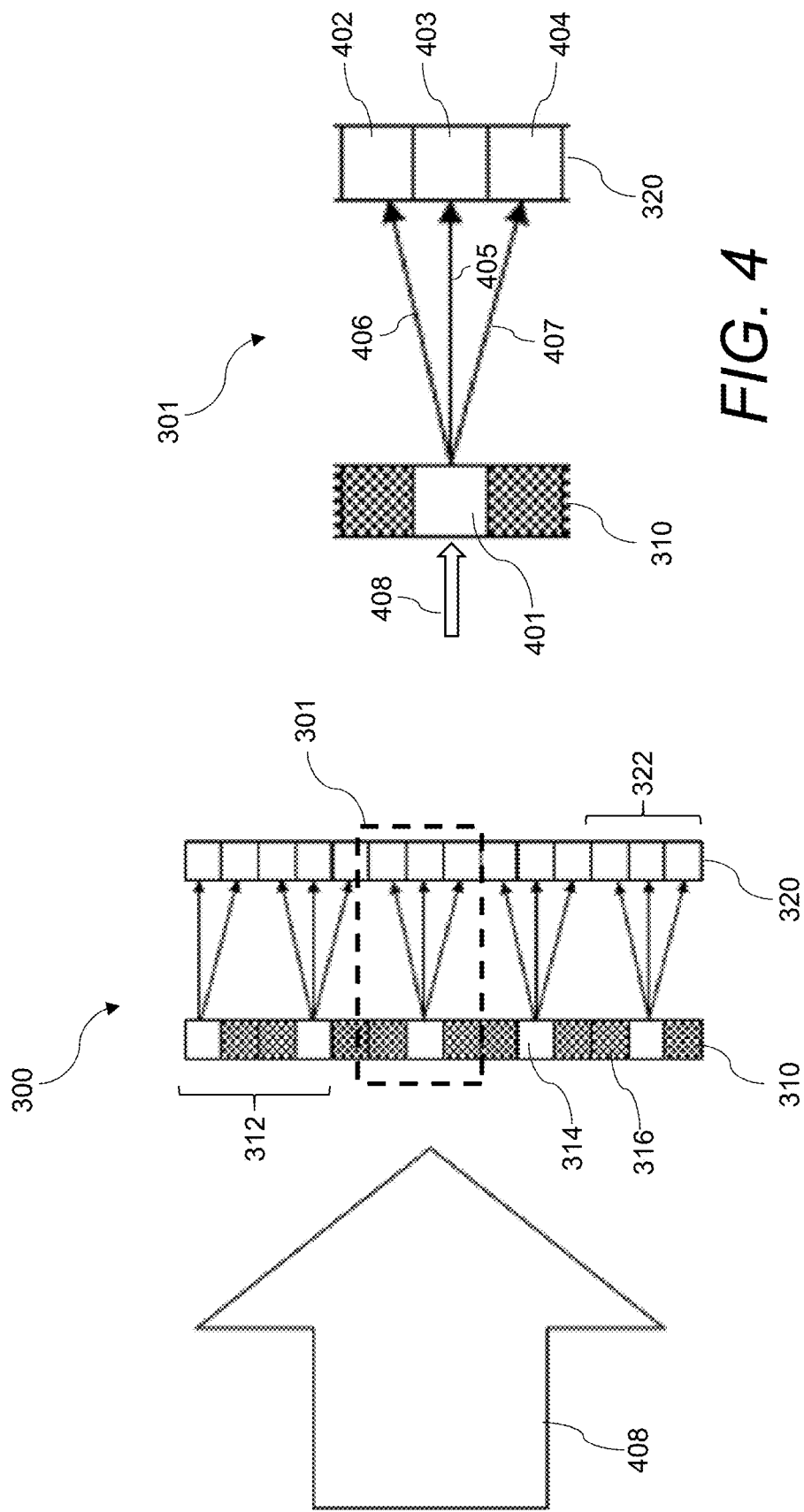

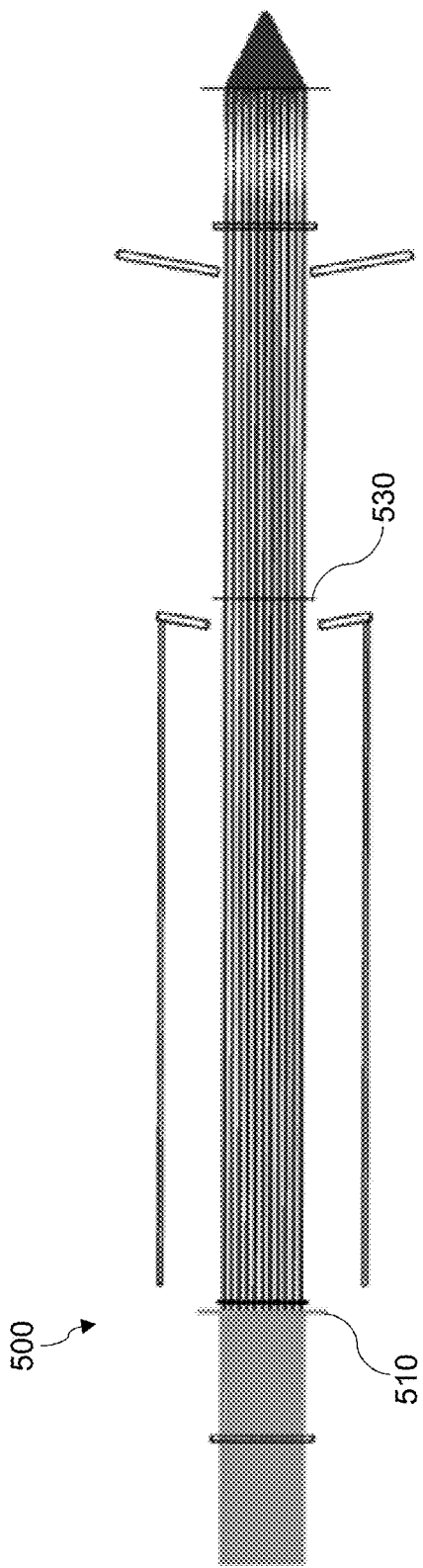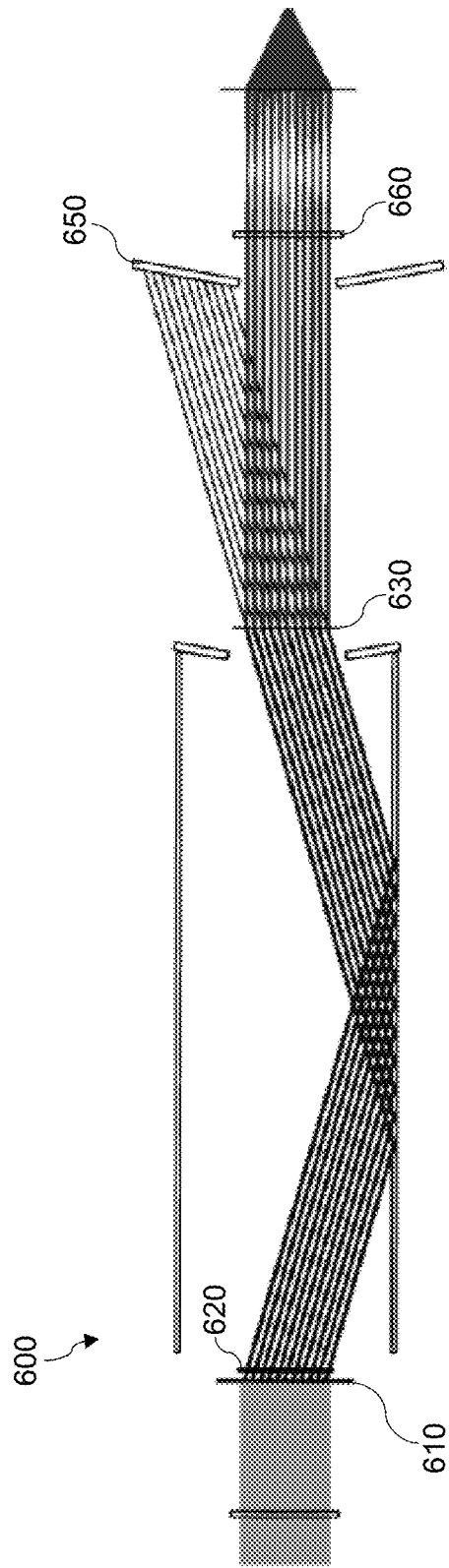

POLARIZATION SCENE PROJECTOR

STATEMENT OF GOVERNMENT INTEREST

The embodiments described herein may be manufactured, used, and licensed by or for the Government of the United States for all governmental purposes without the payment of any royalty.

BACKGROUND

Although many scene projectors exist, there remains a need for more sophisticated scene projectors, e.g., a scene projector that can generate a pixel-by-pixel scene including a desired spatial distribution of intensity levels, particular spectral content (colors), and a desired polarization state.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 3 illustrates a representation of a pixel structure of a polarization scene projector, in accordance with a representative embodiment.

FIG. 4 illustrates a close-up view of a portion of the pixel structure in FIG. 3, in accordance with a representative embodiment.

FIG. 5 illustrates a representation of a polarization scene projector in use during maximum throughput, in accordance with a representative embodiment.

FIG. 6 illustrates a representation of a polarization scene projector in use converting incident light to right circular light, in accordance with a representative embodiment.

DETAILED DESCRIPTION

Figure 1:
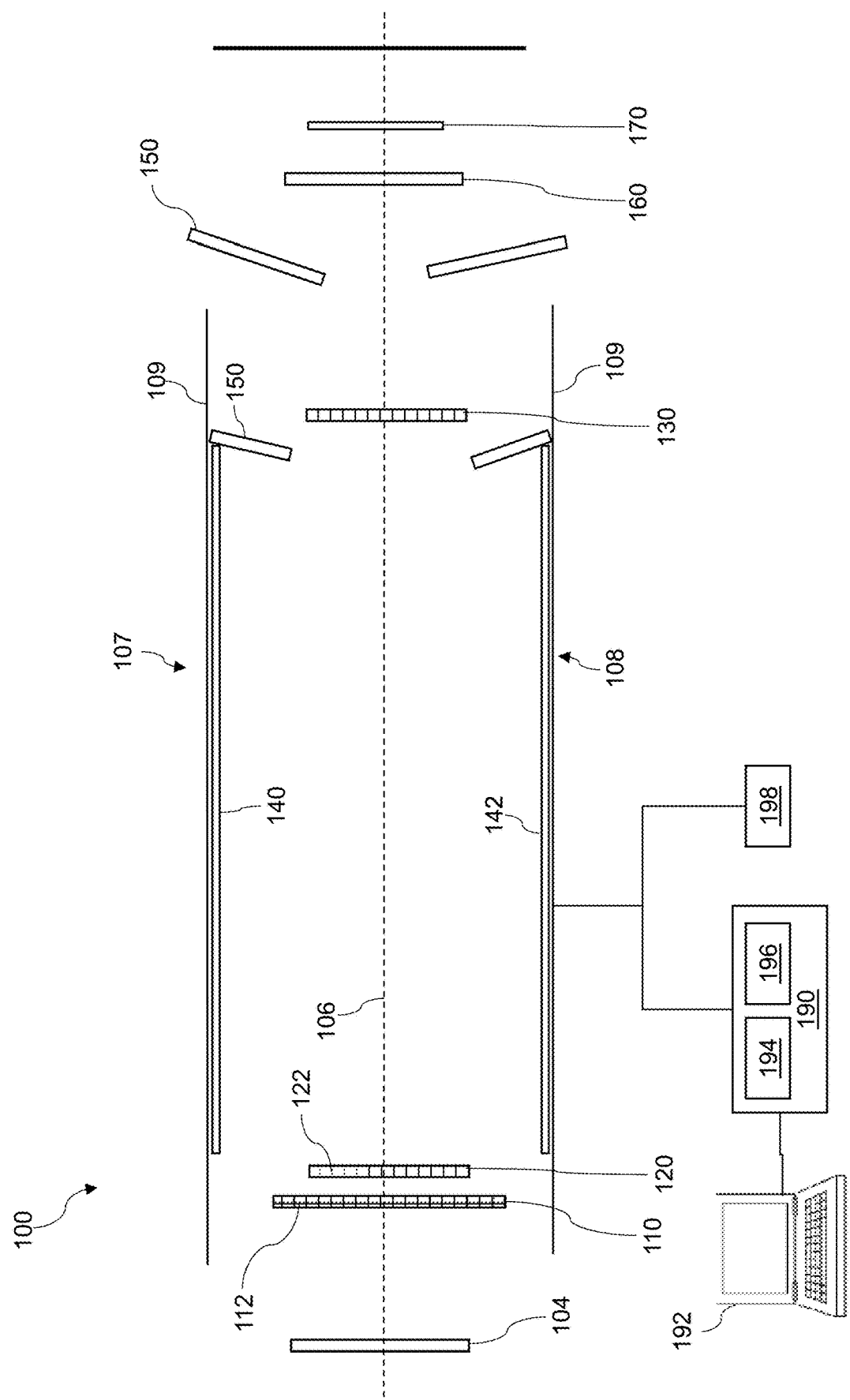
FIG. 1 illustrates a representation of a polarization scene projector, in accordance with a representative embodiment.

The various methods, systems, apparatuses, and devices described herein generally relate to scene projection, and more particularly, to scene projection in which there may be independent control of the degree of polarization, the angle of linear polarization, and the intensity for light output from a scene projector.

While this disclosure is susceptible of being embodied in many different forms, there is shown in the drawings and will herein be described in detail specific embodiments, with the understanding that the present disclosure is to be considered as an example of principles and not intended to be limited to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, the devices, systems, and methods described herein may include a polarization scene projector, e.g., a scene projector that is structurally configured to provide independent control of the degree of polarization, the angle of linear polarization, and the intensity for light output from the scene projector. More particularly, the present teachings include a scene projector capable of generating a high definition, broadband scene with simultaneous control of polarization states and degree of polarization.

The scene projector may generally include a plurality of cycloidal diffractive waveplates (CDWs) that can be used to control the intensity, the degree of polarization, and the orientation of polarization independently for each pixel in a scene being projected. The scene projector may further include reflective surfaces (e.g., mirrored sidewalls) that can provide splitting, manipulation, and recombination of a desired energy. Using the present teachings, different configurations of a scene projector as described herein are possible, e.g., to allow for system flexibility. For example, it will be understood that implementations may be scalable, e.g., in terms of the number of elements, size, and so on, to meet particular polarization projection needs. Further, in certain implementations, the system is not restricted to linear polarization but can also or instead be used for circular polarization states.

The present teachings may thus generally represent an improvement to the state of the art in polarization scene projection, e.g., by providing relatively high-speed scenes projected with pixel-by-pixel control of the degree of linear polarization, the angle of linear polarization, and intensity.

One area of use for the present teachings is in the field of bio-inspired research and applications stemming from such research efforts. For example, in some bio-inspired research efforts, various insects and crustaceans respond to varying states of polarized light. To properly stimulate and study such subjects, it may be beneficial to use a scene projector that can generate a pixel-by-pixel scene that includes the desired spatial distribution of intensity levels, appropriate spectral content (colors), and a desired polarization state. For most instances, the polarization need only be encoded with the degree of linear polarization and the angle of linear polarization, and a scene projector according to the present teachings may be used for these ends. However, it will be understood that a scene projector according to the present teachings may be adapted for other uses, e.g., where the scene projector can be used to generate pixel information with circular polarization handedness and degree of circular polarization. Additional uses for a scene projector according to the present teachings may include, but are not limited to, human perceptual testing of consumer products (e.g., polarized sunglasses) under various controlled conditions, testing of polarization-dependent sensor systems (e.g., scientific cameras), and so on. All such use cases and adaptations are intended to fall within the scope of this disclosure.

Figure 2:
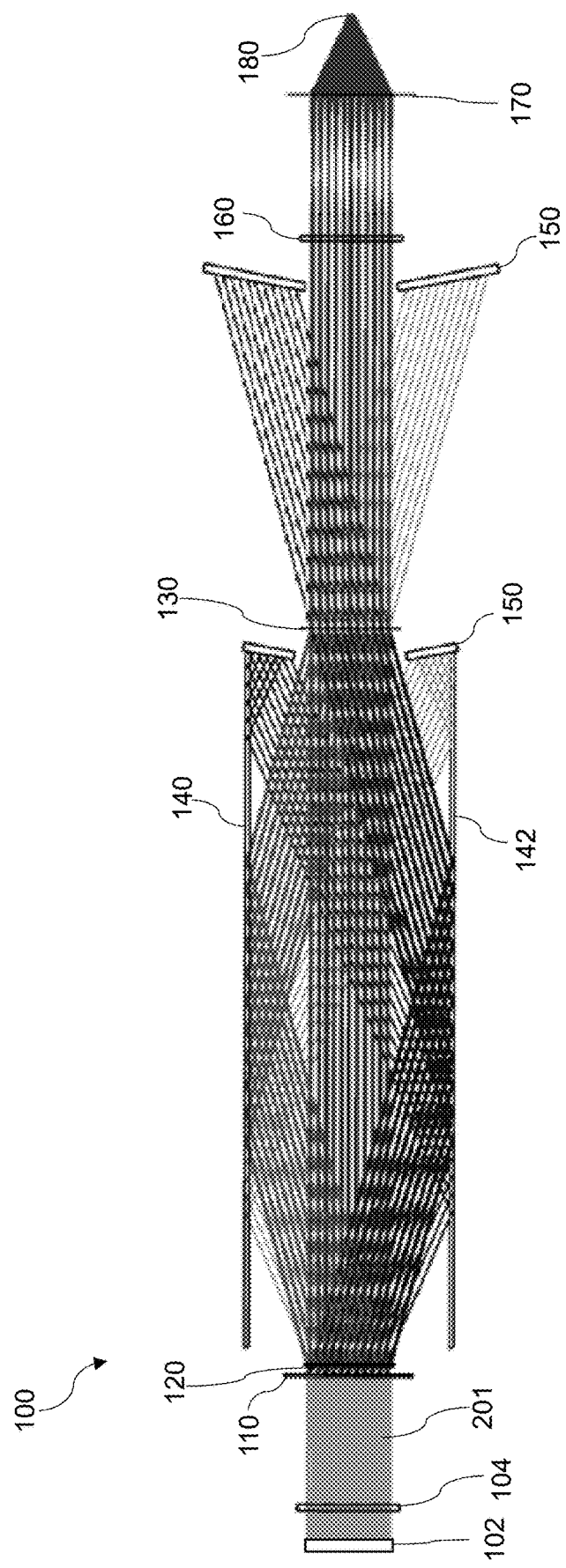
FIG. 2 illustrates a representation of a polarization scene projector in use, in accordance with a representative embodiment.

FIG. 1 illustrates a representation of a polarization scene projector 100, in accordance with a representative embodiment, and FIG. 2 illustrates a representation of the scene projector 100 in use, in accordance with a representative embodiment. Specifically, FIGS. 1 and 2 show a scene projector 100 in which an output image 180 is created from multiple pixels, where each pixel may have independent control of brightness, degree of polarization, and angle of linear polarization. FIG. 1 shows the scene projector 100 with no light passing through, and FIG. 2 shows an example of the scene projector 100 in operation, i.e., with light 201 passing through.

Although described in the context of a scene projector 100, it will be understood that any of the components described herein as part of the scene projector 100 may also or instead be included in a projection system, e.g., separate from the scene projector 100 itself, but part of the overall system. By way of example, a light source 102 is shown in FIG. 2 and may be included as part of a scene projector 100, or the light source 102 may be a component that is separate and distinct from the scene projector 100, but instead is part of an overall projection system or the like.

The scene projector 100 may include a plurality of cycloidal diffractive waveplates (CDWs), which may also be referred to as liquid crystal polarization gratings (LCPGs), and a plurality of reflective surfaces. Specifically, the scene projector 100 may include a first CDW 110, a second CDW 120, a first reflective surface 140, and a second reflective surface 142. The scene projector 100 may also include the light source 102, a homogenizer 104, a grating structure 130 downstream from the first CDW 110 and the second CDW 120, one or more baffles 150, a quarter wave plate 160, and one or more optical elements 170 to condition light within, or output from, the scene projector 100.

In general, the first CDW 110 and the second CDW 120 may be successive, spatially separated CDWs of the scene projector 100. It will be understood that any of the CDWs (or, more generally, any of the gratings) described herein may be the same or similar to those described in U.S. patent application Ser. No. 15/688,981 filed on Aug. 29, 2017 and U.S. patent application Ser. No. 15/689,022 filed on Aug. 29, 2017, where each of the foregoing applications is hereby incorporated by reference in its entirety. The priority document for each of the foregoing applications, U.S. Provisional Application No. 62/509,996 filed May 23, 2017, is similarly incorporated by reference in its entirety.

Further details on the particulars of an exemplary CDW are also described with reference to FIG. 9 below. But, in general, one or more of the first CDW 110 and the second CDW 120 (or pixels included therein) may include a liquid crystal layer disposed between two substrates, where one or more of the two substrates is coated with a photo-alignment layer adjacent to the liquid crystal layer and coated with transparent electrodes. Further, one or more of the first CDW 110 and the second CDW 120 (or pixels included therein) may be switchable responsive to a voltage, with a grating period selected such that, when the voltage is applied thereto and light is passed therethrough, optical energy from the light in plus and minus first orders is deflected toward sides of the CDW and optical energy from a zero order is allowed to pass through the CDW, with a polarization state maintained from an input through an output thereof.

Turning back to FIGS. 1 and 2, the first CDW 110 may be positioned to receive light 201 from the light source 102. The first CDW 110 may include a plurality of first pixels 112 that are switchable such that optical energy of light from a zero order passes through a first pixel 112 along an optical axis 106 and optical energy of light from plus and minus first orders is deflected away from the optical axis 106 through the first pixel 112. More particularly, a polarization state of the plus and minus first orders exiting the first pixel 112 may be circularly polarized with substantially opposite handedness and substantially equal magnitudes. Further, a polarization state of the zero order may be maintained through the first pixel 112. As discussed above, each of the plurality of first pixels 112 may include a liquid crystal layer disposed between two substrates, where one or more of the two substrates is coated with a photo-alignment layer adjacent to the liquid crystal layer and coated with transparent electrodes.

The second CDW 120 may be disposed downstream of the light source 102 and the first CDW 110. The second CDW 120 may include a plurality of second pixels 122 positioned to receive diffracted orders of light from the first CDW 110. Specifically, the second CDW 120 may include at least three second pixels 122 for every first pixel 112, where these three second pixels 122 correspond to each diffracted order received from a first pixel 112.

Thus, the first CDW 110 and the second CDW 120 may generally include pixelated structures, e.g., where the first CDW 110 has an effective pixel pitch equal to three times the pixel pitch of the second CDW 120. As discussed herein, one or more of the first CDW 110 and the second CDW 120 may be switchable by applying a voltage thereto, e.g., on a pixel-by-pixel basis, or as a whole. In certain implementations, for every three blocks of the first CDW 110 in each direction, one block is switchable, functioning as a first pixel 112. Further, in certain implementations, in the second CDW 120, every block may be switchable, and every block may correspond to a particular output of the first CDW 110.

One or more of the first CDW 110 and the second CDW 120 may include inactive pixels and active pixels. For example, in certain implementations, the first CDW 110 may include inactive pixels in addition to the first pixels 112, which can be considered the active pixels of the CDW. By way of example, there may be at least two inactive pixels for every first pixel 112 in the first CDW 110. One or more of the inactive pixels may be physically blocked from transmitting light therethrough, coated with a reflective coating, coated with a light absorbing coating, and so on. One or more of the inactive pixels may instead include a polarization grating structure with a higher diffraction angle than that of the first pixel 112. In this manner, light may be diffracted such that it is not directed toward the second CDW 120 from an inactive pixel.

Thus, the first CDW 110 and the second CDW 120 may include pixelated structures, e.g., with active and inactive pixels. Some examples of pixel configurations will now be described. As discussed above, the second CDW 120 may include a plurality of second pixels 122 positioned to receive the diffracted orders of light from the first CDW 110, where there are at least three second pixels 122 for one first pixel 112. In certain implementations, at least one of these three second pixels 122 is purely transmissive. Further, one or more of the plurality of second pixels 122 may be switchable by applying a voltage thereto. In some implementations, the second CDW 120 includes no inactive pixels. Further, pixel pitches of the first CDW 110 and the second CDW 120 may be substantially equal. Also, or instead, grating periods of the first CDW 110 and the second CDW 120 may be substantially equal, although this is not required, allowing for more flexibility in the design of the scene projector 100.

In other implementations, grating periods of the first CDW 110 and the second CDW 120 may be different.

As discussed herein, the scene projector 100 may include a plurality reflective surfaces—e.g., the first reflective surface 140 and the second reflective surface 142. The first reflective surface 140 may be positioned to receive diffracted orders of light from the second CDW 120. Similarly, the second reflective surface 142 may be positioned to receive diffracted orders of light from the second CDW 120. Thus, the first reflective surface 140 and the second reflective surface 142 may be sized and positioned according to diffraction angles of light from one or more of the first CDW 110 and the second CDW 120. In certain implementations, at least one of the first reflective surface 140 and the second reflective surface 142 is a mirror, e.g., each of the first reflective surface 140 and the second reflective surface 142 may include a mirror. In this manner, one or more of the first reflective surface 140 and the second reflective surface 142 may provide for maximum reflectivity.

As shown in FIGS. 1 and 2, the first reflective surface 140 and the second reflective surface 142 may be separate and distinct from one another, e.g., disposed opposite one another within the scene projector 100. The first reflective surface 140 and the second reflective surface 142 may instead represent different portions of the same reflective surface, or may instead be situated on a similar component or surface (e.g., instead of being disposed opposite one another). Thus, different configurations of the first reflective surface 140 and the second reflective surface 142 from that shown in the figures are possible. In general, each of the first reflective surface 140 and the second reflective surface 142 may direct at least some light received from the second CDW 120 toward the grating structure 130. To this end, the second CDW 120 may be positioned adjacent to one or more of the first reflective surface 140 and the second reflective surface 142.

As discussed above, many different configurations for the first reflective surface 140 and the second reflective surface 142 are possible. For example, as shown in the figures, one or more of the first reflective surface 140 and the second reflective surface 142 may be disposed such that its surface normal is substantially orthogonal to the optical axis 106. As also discussed above, the first reflective surface 140 and the second reflective surface 142 may be disposed opposite one another within the scene projector 100. For example, the first reflective surface 140 may be located on a first side 107 of the scene projector 100, and the second reflective surface 142 may be located on a second side 108 of the scene projector 100, where the second side 108 is disposed opposite the first side 107. By way of further example, the first reflective surface 140 and the second reflective surface 142 may each be disposed on a sidewall 109 of the scene projector 100. In certain implementations, the entire sidewalls 109 of the scene projector 100 may include a reflective surface. In this manner, in certain implementations, the overall length of the device (and hence the length of reflective sidewalls 109) may be determined by the diffraction angles of one or more of the first CDW 110 and the second CDW 120.

As discussed above, the reflective surfaces may provide a folding function for light, e.g., to direct light back into the grating structure 130, and/or to provide a combining function. That is, the output orders of the first CDW 110 and the second CDW 120 may be diverging from the on-axis region of the scene projector 100, but the reflective surfaces may be positioned to create an effective convergence of the orders back toward the optical axis 106. The position where the convergence of the orders occurs is where the grating structure 130 may be placed.

The grating structure 130 may include a third CDW. Such a third CDW may be structurally configured to perform a combining function for light received from the first reflective surface 140 and the second reflective surface 142. Such a third CDW may also or instead include a single element, polymerized (non-switchable) grating with a grating period substantially equal to that of one or more of the first CDW 110 and the second CDW 120. The grating structure 130 may be designed for a particular combining percentage of the orders depending on the particular application of the scene projector 100. In certain implementations, the grating structure 130 may be a switchable element for more control if so desired.

In general, the grating structure 130 may be positioned where light that is reflected from each of the first reflective surface 140 and the second reflective surface 142 converges. As stated above, the grating structure 130 may also or instead be switchable, e.g., similar to one or more of the first CDW 110 and the second CDW 120. For example, the grating structure 130 may be switchable by applying a voltage to the grating structure 130, or to one or more pixels of the grating structure 130.

Light output from the grating structure 130 may include a predetermined combination of right circular light, left circular light, and unpolarized light. Further, in general, a combination of the first CDW 110, the second CDW 120, and the grating structure 130 may establish independent control of degree of polarization, angle of linear polarization, and intensity for light output from the scene projector 100. Thus, in general, after the grating structure 130, the system output at each pixel may be composed of a selected combination (using the first CDW 110, the second CDW 120, and the grating structure 130 if it is switchable) of right circular light, left circular light, and unpolarized light.

The homogenizer 104 may be optionally included in the scene projector 100. In such instances, the homogenizer 104 may be positioned between the light source 102 and the first CDW 110. Generally, the homogenizer 104 may be structurally configured to create a predetermined illumination pattern of light received from the light source 102.

The scene projector 100 may include components or features to control undesirable light. To this end, as discussed above, the scene projector 100 may include one or more baffles 150. A baffle 150 may be included in the present teachings to block or absorb light, e.g., one or more baffles 150 may be positioned to block or absorb undesirable light in the scene projector 100. Undesirable light that is blocked or absorbed by a baffle 150 may be output from one or more of the first CDW 110, the second CDW 120, and the grating structure 130. Undesirable light may also or instead be reflected from one or more of the first reflective surface 140 and the second reflective surface 142.

The baffles 150 may be disposed in predetermined locations, and at predetermined angles or configurations, depending upon the application of the scene projector 100. The baffles 150 may also or instead be adjustable or movable, e.g., depending upon the application of the scene projector 100. The baffles 150 may come in a variety of shapes and include a variety of materials as will be understood to a skilled artisan. In certain implementations, controlling undesirable light may be provided by other elements of the scene projector 100 such that baffles 150 are not included—e.g., a mounting structure, an aperture, and so on, can be used to provide this function.

In projection applications where a scene is desired with control of circular polarizations and degree of circular polarization, the output may be conditioned accordingly. To this end, the scene projector 100 may include a quarter wave plate 160 and/or one or more optical elements 170.

The quarter wave plate 160 may be positioned downstream of the grating structure 130. In certain implementations, only a specific angle of linear polarization and degree of linear polarization are desired, and this may be accomplished with the inclusion of such a quarter wave retarder (the quarter wave plate 160) located downstream of the grating structure 130. The quarter wave plate 160 may convert right circular light to +45 degree linear polarization and left circular light to −45 degree linear polarization. The ratio of these two components may determine the angle of linear polarization, and the ratio obtained from the sum of +45 and −45 linear polarizations divided by the unpolarized component may determine the degree of linear polarization. It should be noted that the quarter wave plate 160 (or other quarter wave retarder) may include a variety of devices providing a quarter wave of optical retardation. This could include, for example, a classic birefringent glass plate, a metamaterial device, a photonic crystal, a CDW, and so on.

As discussed above, the scene projector 100 may include one or more optical elements 170 to condition light within, or output from, the scene projector 100. Specifically, the optical elements 170 may be structurally configured to condition light output from the grating structure 130. In certain implementations, an optical element 170 includes a lens. For example, the optical element 170 may include one or more of a lenslet array and a collimating lens. In certain implementations, the inclusion of a lenslet array may not specifically include an array of glass or plastic lenslets, but could instead include a metamaterial device, a CDW, or another array of pixel-like elements performing a convergence or divergence of optical energy. An optical element 170 included in the present teachings may also or instead include a diffuser.

Thus, the output of the scene projector 100 can be conditioned as desired for projection using various mechanisms. In certain embodiments, because the output is collimated and on axis, each pixel can be brought through a focus using a lens. Because a single lens across the entire output may not be effective in certain implementations, a lenslet array may be appropriate, e.g., with miniature lens on axis for each pixel. A large collimating lens for the entire field can then be used in a conventional manner.

The light source 102 may include one or more light-emitting diodes (LEDs), e.g., an array of LEDs. The light source 102 may also or instead include a broadband illumination source. In certain implementations, unpolarized light is output from the light source 102, e.g., where the scene projector 100 may polarize and otherwise condition the light while providing independent control of degree of polarization, angle of linear polarization, and intensity for light output from the scene projector 100.

The scene projector 100 may further include, or otherwise be in communication with, a controller 190 and a computing device 192. The controller 190 may include, or otherwise be in communication with, a processor 194 and a memory 196. The controller 190 may be electronically coupled (e.g., wired or wirelessly) in a communicating relationship with one or more of the components of the scene projector 100. In general, the controller 190 may be operable to control one or more of the components of the scene projector 100, e.g., to control or tune one or more of the light source 102, the homogenizer 104, the first CDW 110, the second CDW 120, the grating structure 130, the reflective surfaces 140, 142, the baffles 150, the quarter wave plate 160, and the optical elements 170.

In general, the controller 190 may be electrically coupled in a communicating relationship, e.g., an electronic communication, with any of the components of the scene projector 100. The controller 190 may include any combination of software and/or processing circuitry suitable for controlling the various components of the scene projector 100 described herein including without limitation processors 194, microprocessors, microcontrollers, application-specific integrated circuits (ASIC), programmable gate arrays, and any other digital and/or analog components, as well as combinations of the foregoing, along with inputs and outputs for transceiving control signals, drive signals, power signals, sensor signals, and the like. In certain implementations, the controller 190 may include a processor 194 or other processing circuitry with sufficient computational power to provide related functions such as executing an operating system, providing a graphical user interface (e.g., to a display coupled to the controller 190 or another component of the scene projector 100), set and provide rules and instructions for operation of a component of the scene projector 100, convert sensed information into instructions, and operate a web server or otherwise host remote operators and/or activity through a communications interface.

The processor 194 may be any as described herein or otherwise known in the art. The processor 194 may be included on the controller 190, or it may be separate from the controller 190, e.g., it may be included on a computing device 192 in communication with the controller 190 or another component of the scene projector 100. In an implementation, the processor 194 is included on or in communication with a server that hosts an application for operating and controlling components of the scene projector 100.

The memory 196 may be any as described herein or otherwise known in the art. The memory 196 may contain computer code and may store data such as instructions for controlling the scene projector 100. The memory 196 may contain computer executable code stored thereon that provides instructions for the processor 194 for implementation. The memory 196 may include a non-transitory computer readable medium, such as ROM, PROM, EEPROM or any other suitable electronic storage medium.

The scene projector 100 may include a computing device 192 in communication with one or more of the components of the scene projector 100 including without limitation the controller 190. The computing device 192 may include a user interface, e.g., a graphical user interface, a text or command line interface, a voice-controlled interface, and/or a gesture-based interface. In general, the user interface may create a suitable display on the computing device 192 for operator interaction. In implementations, the user interface may control operation of one or more of the components of the scene projector 100, as well as provide access to and communication with the controller 190, processor 194, and other resources. The computing device 192 may thus include any devices within the scene projector 100 operated by operators or otherwise to manage, monitor, communicate with, or otherwise interact with other components the scene projector 100 or a system including one or more scene projectors 100. This may include desktop computers, laptop computers, network computers, tablets, smartphones, or any other device that can participate in the scene projector 100 as contemplated herein.

The scene projector 100 may include other hardware 198. In certain implementations, the other hardware 198 may include a camera, a power source, a sensor, a database, and the like. The other hardware 198 may also or instead include input devices such as a keyboard, a touchpad, a computer mouse, a switch, a dial, a button, and the like, as well as output devices such as a display, a speaker or other audio transducer, lighting or display components, peripheral device and the like. Other hardware 198 of scene projector 100 may also or instead include a variety of cable connections and/or hardware adapters for connecting to, e.g., external computers, external hardware, external instrumentation or data acquisition systems, and the like.

In additional embodiments, the second CDW 120 may be combined with one or more of the reflective surfaces. That is, the pixel elements of the second CDW 120 may be applied in a reflective configuration at appropriate positions on the reflective surfaces.

In other embodiments, the light source 102 may not include a source as previously shown, nor may it include a homogenizer. In this case, an LED (or other source) array could be utilized with a lenslet array to collimate each LED pixel, e.g., only using (or having) pixels in positions corresponding to pixel locations in the first CDW 110. In such an embodiment, an additional level of system control and flexibility may be introduced.

Another embodiment may not utilize a quarter wave retarder to convert output light to linear polarization, but instead may allow the output to be combinations of left and right circularly polarized light.

Moreover, broadband capability of the scene projector 100 may be accomplished through at least two approaches. The first approach may include the use of a broadband illumination source and broadband CDWs. That is, while high performance broadband CDWs have been used for visible wavelengths, similar approaches could be used for infrared applications. The second approach may include the use of broadband illumination using multiple projectors, where each operates at a different, narrow spectrum. The individual projector outputs may then be combined prior to a lenslet array and collimation optics.

Having provided an overall description of a scene projector 100 according to the present teachings, examples of specific pixel structures are included below.

FIG. 3 illustrates a representation of a pixel structure 300 of a polarization scene projector, in accordance with a representative embodiment. Specifically, a pixel structure 300 in one dimension is illustrated in FIG. 3.

The pixel structure 300 shown in FIG. 3 may represent the structure of a first CDW 310 having a plurality of first pixels 312 and a second CDW 320 having a plurality of second pixels 322 (where the first CDW 310 and the second CDW 320 may be the same or similar to the first CDW 110 and a second CDW 120 described above with reference to FIGS. 1 and 2). As shown in FIG. 3, the effective fill factor may be one-ninth for a pixel pattern that is symmetric along horizontal and vertical directions. In FIG. 3, unshaded pixel blocks in the first CDW 310 represent transmissive pixels 314 and shaded pixel blocks in the first CDW 310 represent non-transmissive pixels 316 in this example embodiment, but it will be understood that the shaded pixels could be switchable elements in other embodiments. Similarly, in this example, pixels in the first CDW 310 and the second CDW 320 have the same dimensions, but the size and shape of the pixels could be different in other embodiments.

As shown in the figure, the first CDW 310 may have an effective pixel pitch of one-third of the overall pitch. For each transmissive pixel 314 (switchable element) in the first CDW 310, there may be three corresponding transmissive pixels (switchable elements) in the second CDW 320, e.g., one corresponding to each diffracted order of the first CDW 310 with no overlap of diffracted orders from other switchable elements (pixels) of the first CDW 310.

Each switchable element of the first CDW 310 may be composed of the same polarization grating structure, split by element through addressing. The blocks of unneeded area in the first CDW 310 can form the non-transmissive pixels 316, which can be physically blocked, coated with a reflective or absorbing material, or composed of a polarization grating structure having a significantly higher diffraction angle to remove light from the system. However, in certain implementations, these extra pixel blocks could be switchable (e.g., with a polarization grating or a liquid crystal structure) to allow for more control of the system output.

A portion 301 of the pixel structure 300 is an example of one effective pixel structure in FIG. 3, where more detail on this specific portion 301 of the pixel structure 300 is shown and described with reference to FIG. 4. Specifically, FIG. 4 illustrates a close-up view of a portion 301 of the pixel structure 300 in FIG. 3 that includes a single transmissive pixel of the first CDW 310 transmitting diffracted orders of light to the second CDW 320. For convenience, in reference to FIG. 4, the transmissive first pixel will be referred to as pixel 401, and the three pixels of the second CDW 320 shown in FIG. 4 will be referred to as pixel 402, pixel 403, and pixel 404.

With unpolarized input light, pixel 401 of the first CDW 310 may direct the optical energy into some combination of the zero diffracted order 405 (also known as the zero order), the plus one diffracted order 406 (also known as the plus first order), and the minus one diffracted order 407 (also known as the minus first order), depending on the applied voltage to pixel 401. Energy from the zero diffracted order 405 may maintain an unpolarized state of the input 408 through pixel 401. The plus one diffracted order 406 and the minus one diffracted order 407 may be circularly polarized with opposite handedness and equal magnitudes.

For a given pixel (switchable element, pixel 401) of the first CDW 310, the second CDW 320 may have three corresponding switchable elements, pixel 402, pixel 403, and pixel 404. Pixel 403 may correspond to the path of the zero diffracted order 405 from pixel 401 of the first CDW 310, and may thus be aligned directly with pixel 401, e.g., along the same optical axis. In certain implementations, the zero diffracted order 405 from pixel 401 is unpolarized, so the input to pixel 403 is also unpolarized. In certain embodiments, pixel 403 may be purely transmissive, or a polarization grating structure may be continuously switched to allow for maximum transmission. In other embodiments, pixel 403 can be a switchable element such as polarization grating or a liquid crystal element.

Pixel 402 may correspond to one of the diffracted orders of pixel 401 and may thus be aligned appropriately. By way of example, the input light to pixel 402 may be left circular light, and pixel 402 may be a switchable element that affects the percentage of light into each of its diffracted orders. Continuing with this example, because the input light to pixel 402 is left circular light, there may be no switched conditions in which light can be transferred to the pixels plus first order, and all of the light will be switched into a combination of zero and minus first orders. The path of the zero diffracted order 405 from pixel 401 may continue along the input path from pixel 401, but the path of the minus one diffracted order 407 may have an angle that directs the energy closer to sidewalls of the device.

Pixel 404 may function in a similar manner to pixel 402, with the distinction that its input may be right circular light and that pixel switching controls the amount of light in the zero and plus first orders. In certain implementations, pixel 404 will not switch light into its minus first order.

FIG. 5 illustrates a representation of a polarization scene projector 500 in use during maximum throughput, in accordance with a representative embodiment. That is, FIG. 5 represents an example case where the first CDW 510 is switched such that approximately all energy is diffracted into the zero order. Assuming that the grating structure 530 is designed for equal parts of each branch to be combined, then approximately 50% of the on-axis energy may be diffracted into the zero order of the grating structure 530 and may remain on the optical axis as shown in the figure. System output is unpolarized and is approximately 50% of the maximum value of output of the first CDW 510.

FIG. 6 illustrates a representation of a polarization scene projector 600 in use converting incident light to right circular light, eventually becoming linear polarization at −45 degrees, in accordance with a representative embodiment. Thus, FIG. 6 represents another example use case, where the first CDW 610 is switched such that approximately all of the unpolarized input is diffracted into right circular light in the plus first order and the second CDW 620 is switched to allow all energy to pass through. Continuing with this example, at the grating structure 630, approximately 50% of the energy is diffracted into the zero order and continues to a baffle 650, while the remaining approximately 50% is diffracted into the plus first order and becomes the output light. In this example use case, the output is 100% right circular polarization with an amplitude of approximately 50% of the maximum value of the output of the first CDW 610. Here, the degree of circular polarization is 100%, and after a quarter wave plate 660, the light may become 100% linearly polarized at an angle of −45 degrees.

Figure 7:
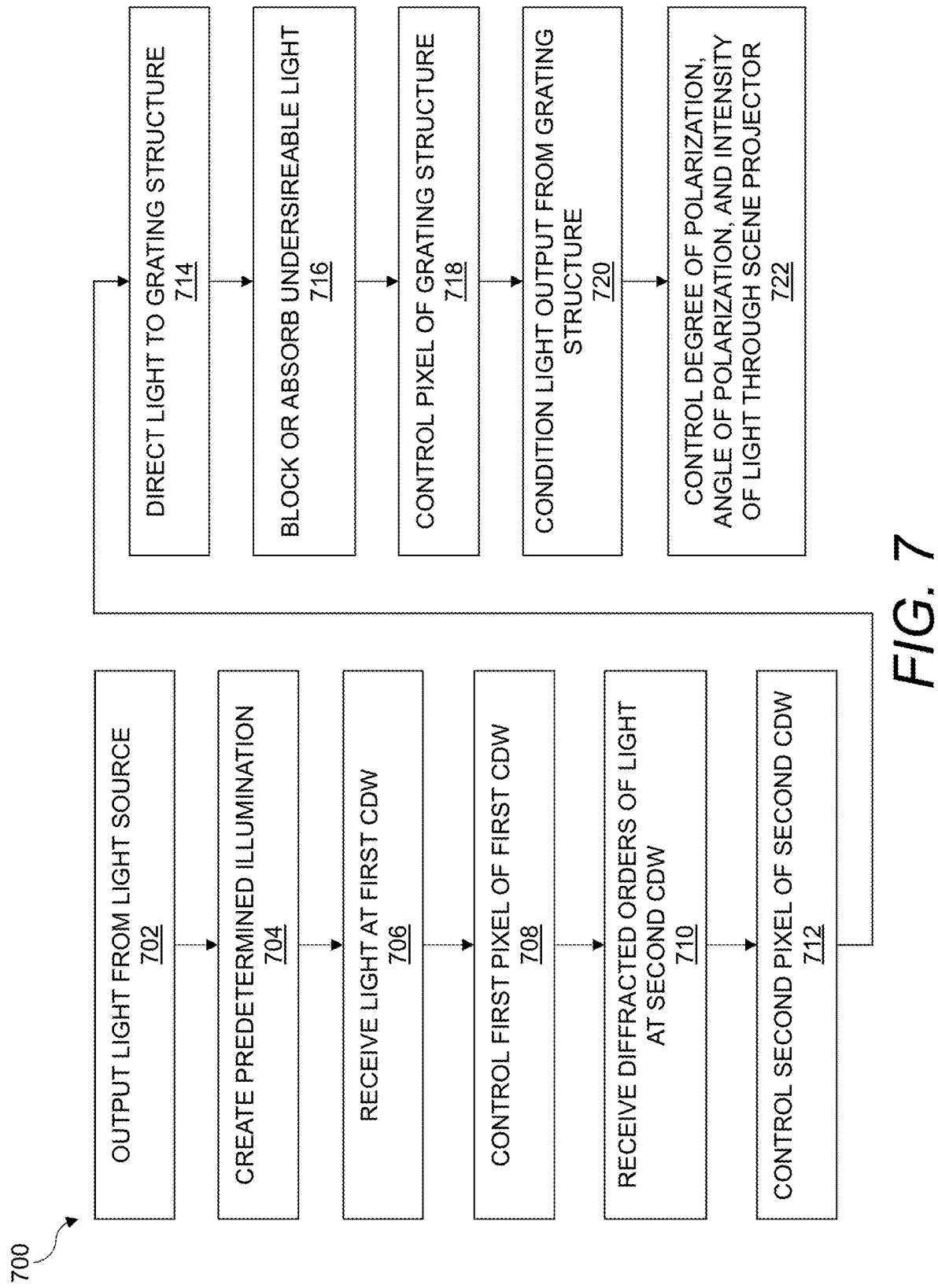
FIG. 7 is a flow chart of a method of scene projection, in accordance with a representative embodiment.

FIG. 7 is a flow chart of a method 700 of scene projection, in accordance with a representative embodiment. The method 700 may be performed using any of the devices and systems disclosed herein. Thus, the method 700 may involve the use of a scene projector having a first CDW including a plurality of first pixels that are switchable such that optical energy of light from a zero order passes through a first pixel along an optical axis and optical energy of light from plus and minus first orders is deflected away from the optical axis through the first pixel, a second CDW disposed downstream of the first CDW, a first reflective surface positioned to receive diffracted orders of light from the second CDW, and a second reflective surface positioned to receive diffracted orders of light from the second CDW, where each of the first reflective surface and the second reflective surface direct at least some light received from the second CDW toward a grating structure. The scene projector may be structurally configured to independently control the degree of polarization, the angle of linear polarization, and the intensity for light using a combination of the first CDW, the second CDW, and the grating structure.

As shown in block 702, the method 700 may include outputting light from a light source to be received by the first CDW. As discussed herein, the light source may include an LED, an array of LEDs, a broadband illumination source, and the like. Light from the light source may be nonpolarized.

As shown in block 704, the method 700 may include creating a predetermined illumination pattern and directing the predetermined illumination pattern toward the first CDW. The predetermined illumination pattern may be created by a homogenizer or a similar component.

As shown in block 706, the method 700 may include receiving light at the first CDW, which again, may include a plurality of first pixels that are switchable such that optical energy of light from a zero order passes through a first pixel along an optical axis and optical energy of light from plus and minus first orders is deflected away from the optical axis through the first pixel.

As shown in block 708, the method 700 may include controlling a first pixel of the plurality of first pixels such that optical energy of light from a zero order passes through the first pixel along an optical axis and optical energy of light from plus and minus first orders is deflected away from the optical axis through the first pixel. Controlling the first pixel may include applying a voltage to the first pixel, or generally to the first CDW. The first pixel, or more generally the first CDW, may be controlled such that a polarization state of the plus and minus first orders exiting the first pixel is circularly polarized with substantially opposite handedness and substantially equal magnitudes. Further, a polarization state of the zero order may be maintained through the first pixel.

As shown in block 710, the method 700 may include receiving diffracted orders of light from the first CDW at the second CDW. The second CDW may include at least three second pixels for one of the first pixels. These three second pixels may correspond to each diffracted order that is received from a first pixel.

As shown in block 712, the method 700 may include controlling a second pixel of the second CDW. Similar to control of the first CDW (and the first pixel), controlling the second pixel may include applying a voltage to the second pixel, or generally to the second CDW.

As shown in block 714, the method 700 may include directing at least some light output from the second CDW toward a grating structure. Directing light output from the second CDW toward the grating structure may include reflecting light using one or more of the first reflective surface and the second reflective surface.

As shown in block 716, the method 700 may include blocking or absorbing undesirable light. This may be accomplished using, e.g., inactive pixels in one or more of the first CDW, the second CDW, and the grating structure. This may also or instead be accomplished through the use of baffles as described herein.

As shown in block 718, the method 700 may include controlling at least one pixel of the grating structure, e.g., by applying a voltage to the pixel, or more generally, to the grating structure.

As shown in block 720, the method 700 may include conditioning light output from the grating structure. For example, conditioning light output from the grating structure may include converting circularly polarized light to linearly polarized light. The conditioning of light may be accomplished through the use of one or more of a quarter wave plate (e.g., positioned downstream of the grating structure), and/or an optical element as described herein.

As shown in block 722, the method 700 may include independently controlling the degree of polarization, angle of linear polarization, and intensity for light using a combination of the first CDW, the second CDW, and the grating structure.

Figure 8:
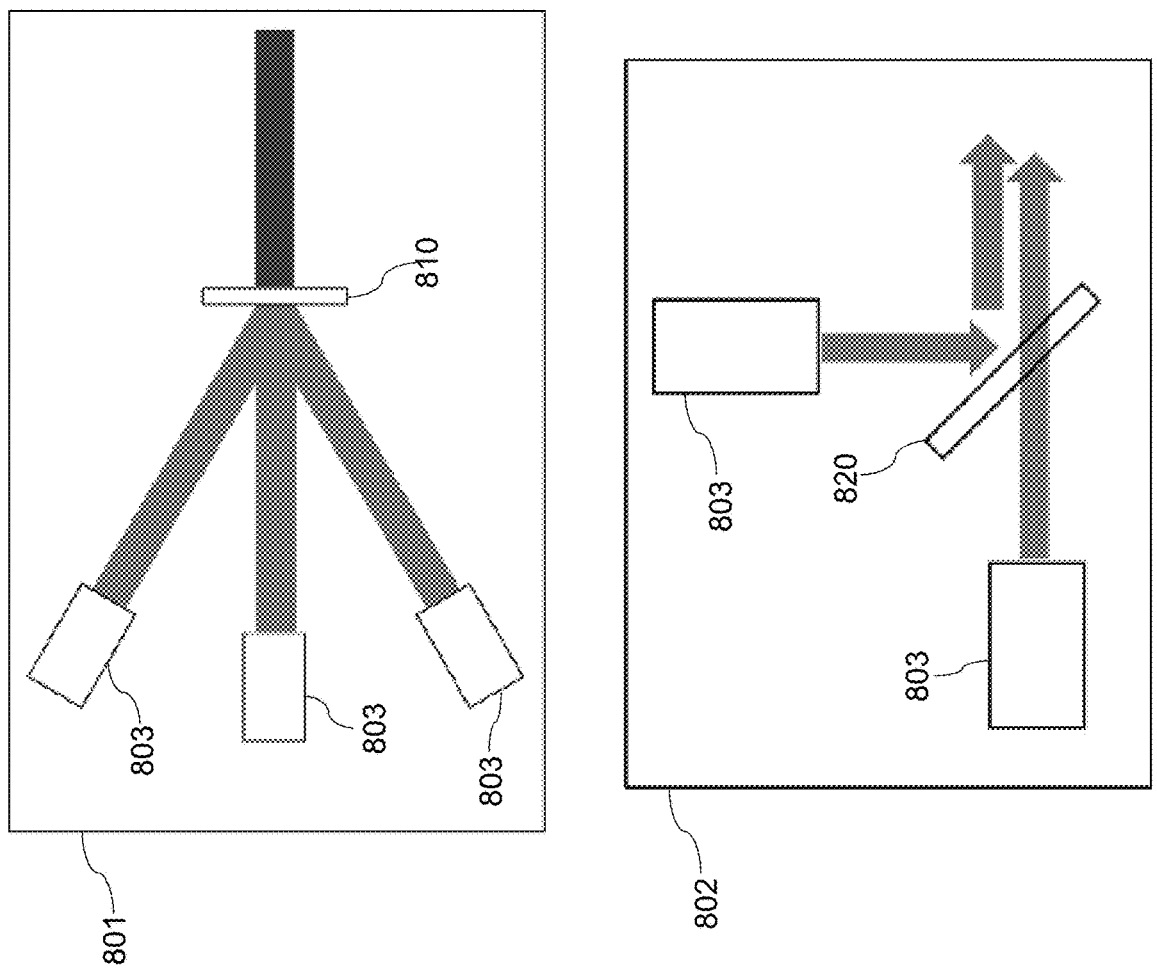
FIG. 8 illustrates representations of systems for scene projection, in accordance with representative embodiments.

FIG. 8 illustrates representations of systems for scene projection, in accordance with representative embodiments. Specifically, FIG. 8 illustrates two example systems—a first system 801 and a second system 802. Each of the systems may feature a plurality of scene projectors 803, where one or more of the plurality of scene projectors 803 (e.g., each of the plurality of scene projectors 803) has independent control of the degree of polarization, the angle of linear polarization, and the intensity for light output therefrom.

As discussed above, each of the systems shown in FIG. 8 may include a plurality of scene projectors 803. The plurality of scene projectors 803 may each be structurally configured for operation at a different spectrum. One or more of the scene projectors 803 may be the same or similar to those described throughout this disclosure. Specifically, as discussed herein, one or more of the plurality of scene projectors 803 (e.g., each of the plurality of scene projectors 803) may include a first CDW including a plurality of first pixels that are switchable such that optical energy of light from a zero order passes through a first pixel along an optical axis and optical energy of light from plus and minus first orders is deflected away from the optical axis, a second CDW disposed downstream of the first CDW and including a plurality of second pixels positioned to receive diffracted orders of light from the first CDW, where there are at least three second pixels for one first pixel that correspond to each diffracted order received from one first pixel, a first reflective surface positioned to receive diffracted orders of light from the second CDW, and a second reflective surface positioned to receive diffracted orders of light from the second CDW, where each of the first reflective surface and the second reflective surface direct at least some light received from the second CDW toward a grating structure.

Each of the systems may further include a combining element structurally configured to combine light that is output from each of the plurality of scene projectors 803. The combining element may include, for example, a CDW or other grating structure, dichroic and polarization beam combining elements, and so on. By way of example, the first system 801 shows a first combining element 810 and the second system 802 shows a second combining element 820, where each of these combining elements may include different structural configurations and techniques for combining light output from multiple scene projectors 803. Specifically, the first combining element 810 of the first system 801 may include a CDW or other grating structure, where the combining functionality is fairly straightforward. Also, or instead, beam combining may be provided using a dichroic beam combining plate or the like, and thus beam combining may be similar to that shown in the second system 802.

In the exemplary second system 802, the output of the scene projector 803 at the top of the system may be at a first wavelength, and the output of the scene projector 803 at the bottom-left of the system may be at a different, second wavelength. The second combining element 820 may be structurally configured such that its left surface has very high transmittance of energy at the second wavelength, and the right surface may be structurally configured such that it is highly reflective at the first wavelength while it simultaneously has a very high transmittance of the second wavelength.

Further, in this example, the substrate of the second combining element 820 may have low absorption at the second wavelength. In this manner, multiple projectors can be combined by sequentially folding in, or adding, one at a time. The surfaces of these types of combiners may be thin film interference coatings and can be broadband to accommodate finite spectral bandwidths instead of narrow wavelengths.

Figure 9:
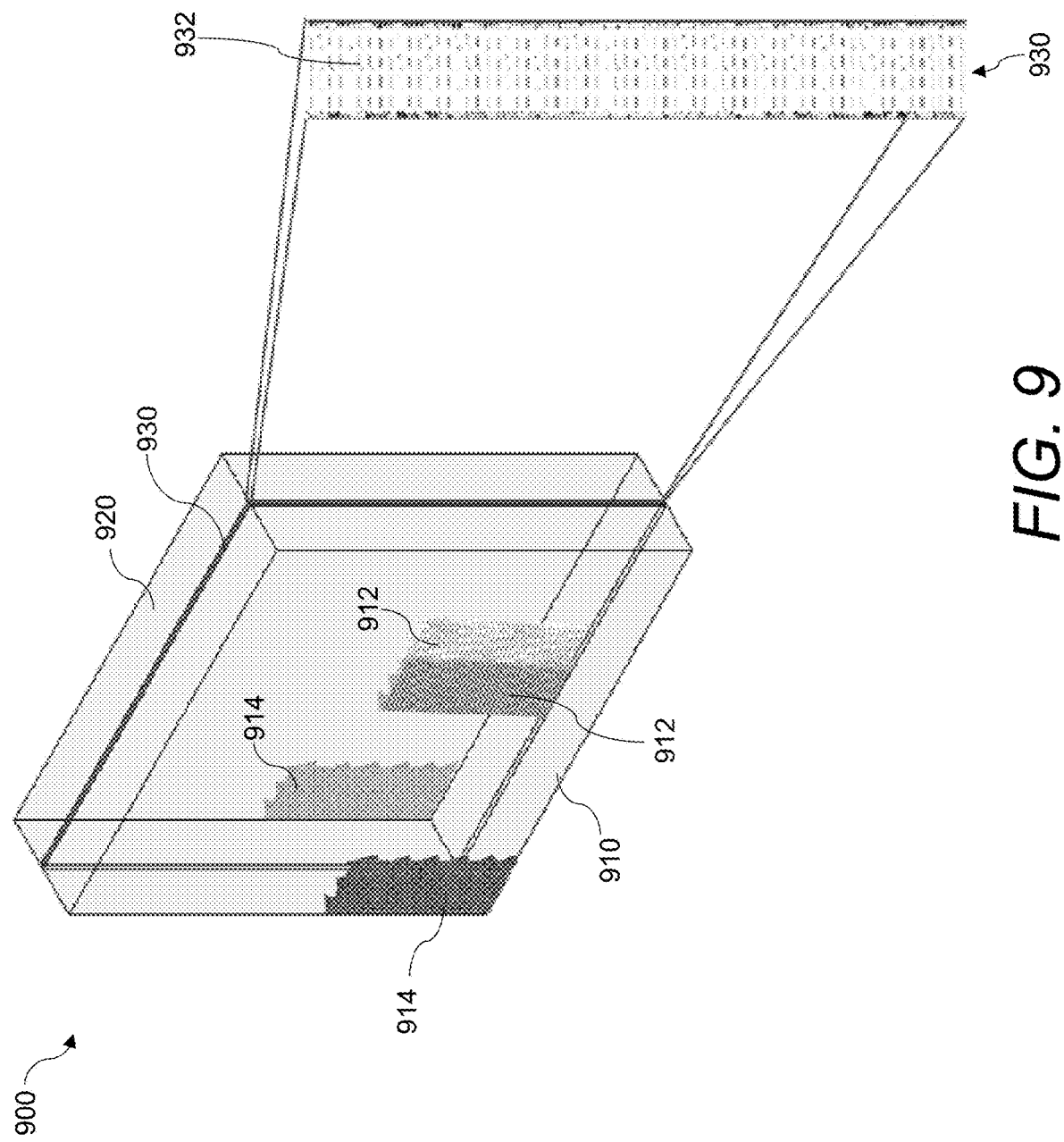
FIG. 9 illustrates a polarization grating, in accordance with a representative embodiment.

FIG. 9 illustrates a polarization grating 900, in accordance with a representative embodiment. The polarization grating 900 is provided for context, and may include a portion of (e.g., may represent a pixel of) one or more of the CDWs or grating structures of the scene projector and projection systems described herein.

Specifically, FIG. 9 illustrates an example of a liquid crystal polarization grating, and even more specifically, FIG. 9 illustrates the physical components of a single transmissive liquid crystal polarization grating 900 (CDW), including a layer of liquid crystal between two substrates with a photo-alignment coating on one side and transparent conductive electrodes on the opposite side of each substrate. The liquid crystal polarization grating 900 may be used in a variety of applications including without limitation displays, imaging applications, modulators, attenuators, and projectors such as those described herein.

The liquid crystal polarization grating 900 may utilize sinusoidal grating patterns rather than binary grating patterns, thereby reducing the complexity of diffracted orders and polarization states. For example, the output of the liquid crystal polarization grating 900 may include the plus and minus first orders and the zero order of the input, where the zero order maintains the same polarization state as the input. In general, the liquid crystal polarization grating 900 may achieve switchable attenuation, achieve broadband performance, and achieve relatively fast switching times (e.g., for high frequency operation). The liquid crystal polarization grating 900 may include a first substrate 910, a second substrate 920, and a liquid crystal layer 930 disposed therebetween.

The first substrate 910 and the second substrate 920 may be the same, e.g., they may be made from the same materials, they may have the same dimensions (e.g., thicknesses, shape, and size), they may have the same coatings, and so on. In other implementations, the first substrate 910 and the second substrate 920 are different, e.g., having one or more of different materials, different dimensions, different coatings, and so on. In certain implementations, the first substrate 910 and the second substrate 920 are glass plates. The first substrate 910 and/or the second substrate 920 may also or instead be made of other materials such as a polymer, silicon, or the like. Embodiments may further include more than two substrates, or a liquid crystal layer 930 formed within a single substrate.

One or more of the first substrate 910 and the second substrate 920 may be coated with one or more of a photo-alignment layer 912 and transparent electrodes 914. In an implementation, one or more of the substrates are coated with the photo-alignment layer 912 and/or transparent electrodes 914. For example, the photo-alignment layer 912 may be disposed on an inside surface of each of the first substrate 910 and the second substrate 920 (where the inside surface is the surface abutting the liquid crystal layer 930), and the transparent electrodes 914 may be disposed on an outside surface (opposite the inside surface) of each of the first substrate 910 and the second substrate 920.

The photo-alignment layer 912 may include any material with properties for photo-alignment as known in the art. In general, the photo-alignment layer 912 may be disposed adjacent to the liquid crystal layer 930. In this manner, the photo-alignment layer 912 may be in physical contact with the liquid crystal layer 930. The photo-alignment layer 912 may be cured in a cycloidal pattern to anchor the liquid crystal layer 930 thereby creating a base for a sinusoidal pattern.

It will be understood that one or more of the substrates may also or instead include photo-alignment properties (e.g., from a material property of the substrate), e.g., in addition to, or instead of, being coated with a photo-alignment layer 912. Thus, in this manner, the photo-alignment properties of one or more of the first substrate 910 and the second substrate 920 may be provided by coating one or more of the first substrate 910 and the second substrate 920 with a photo-alignment layer 912, or the photo-alignment properties may be inherent in the material or otherwise provided. Similarly, one or more of the first substrate 910 and the second substrate 920 may include transparent electrodes 914, which may be coated on the substrates or provided by other means.

The transparent electrodes 914 may be located on the outside of the substrates, within the substrates, or on the inside of the substrates. The transparent electrodes 914 may be selected to operate in a predetermined spectrum. The predetermined spectrum may include a visible spectrum into a short-wave infrared spectrum. To this end, the transparent electrodes 914 may include indium tin oxide (ITO). The predetermined spectrum may instead include a mid-wave infrared spectrum, e.g., a 2.0 μm-5.0 μm spectrum, or a long-wave infrared spectrum. The transparent electrodes 914 may include one or more of carbon nanotubes (CNT), graphene, and gallium arsenide. Thus, in general, the transparent electrodes 914 may be used to control the liquid crystal polarization grating 900, where the transparent electrodes 914 are capable of operating in the spectrum of interest.

It will be understood that one or more of the substrates may also or instead be conductive or otherwise capable of receiving an applied voltage, e.g., in addition to or instead of being coated with transparent electrodes 914.

Liquid crystals 932 in the liquid crystal layer 930 may provide the switchable performance of the liquid crystal polarization grating 900. Thus, in certain implementations, a liquid crystal polarization grating 900 may include a liquid crystal material (e.g., the liquid crystal layer 930) disposed between two glass plates (e.g., the substrates). Each glass plate may be coated on one side with a transparent electrode material such as ITO or graphene, where the other side is coated with a photo-alignment layer 912. For both glass plates, the photo-alignment layers 912 may be in contact with the liquid crystal compound (e.g., the liquid crystal layer 930). The photo-alignment layers 912 may be cured by interfering lasers, which anchor the liquid crystals 932 at the photo-alignment layer 912, thereby creating the base for a sinusoidal (phase) pattern.

In use, as voltage is applied across the liquid crystal polarization grating 900, the liquid crystal molecules may be re-oriented, changing the local retardation of the anisotropic liquid crystals 932 (and/or changing the refractive index) such that a sinusoidally varying spatial pattern of retardation of the refractive index occurs. The local polarization of the incident light may be affected by the retardation introduced by the anisotropic nature of the liquid crystals 932.

Any uniform illumination may result in emerging light with sinusoidally varying (spatially) polarization characteristics, creating a polarization grating phenomenon. Performance of the liquid crystal polarization grating 900, and thus performance of a projector including such a liquid crystal polarization grating 900, may be related to the local retardation. Physical processes and an explanation of the name "cycloidal diffractive waveplates" (CDW) is described, e.g., in S. R. Nersisyan et al., "The principles of laser beam control with polarization gratings introduced as diffractive waveplates," Proc. SPIE 7775, Liquid Crystals XIV, 77750U (Aug. 17, 2010), which is incorporated by reference in its entirety.

For a liquid crystal polarization grating 900 with a liquid crystal cell thickness of d, a birefringence of Δn, and operating at a wavelength λ, the grating efficiency η is governed by:

$$\eta(\lambda) = \cos^2\left(\frac{\pi \Delta n d}{\lambda}\right) \qquad \text{Eq. 1}$$

Though not explicitly stated in Eq. 1, the birefringence may be a function of applied voltage. In other words, as the applied voltage changes, the retardation changes as a result of the reorientation of the liquid crystals 932.

The thickness of the liquid crystal cell or liquid crystal layer 930 in a liquid crystal polarization grating 900 may be selected, controlled, or manipulated to perform different functions, e.g., to achieve different attenuation characteristics for light passing through the liquid crystal polarization grating 900 or a series of liquid crystal polarization gratings 900. For example, the thickness of the liquid crystal layer 930 may be selectively used in an attenuator or an attenuator system featuring a plurality of liquid crystal polarization gratings 900. The principles of the effects of the thickness of the liquid crystal layer 930 are briefly described below.

As shown in Eq. 1 above, the product of the index of refraction n and thickness of an element (in the present teachings, the thickness of the liquid crystal, d) is the optical path length, which is directly related to the amount of phase change the light experiences in passing through the liquid crystal polarization grating 900. When the index is anisotropic (as in the case of the liquid crystals in the present teachings), there is a different phase change for the two perpendicular polarizations states (this comes from a difference of refractive indices, called birefringence). The difference in phase is the amount of retardation that is experienced by the light—this is the concept of a waveplate. In a CDW application, unlike a standard waveplate, the amount of retardation may not be uniform, but it has an associated sinusoidal (cycloidal) pattern. If the thickness of the liquid crystal cell is changed, the amount of retardation may be changed, which, for a given birefringence (e.g., equivalent in the present teachings to a given control voltage) and wavelength, changes how much energy is transferred to each diffracted order. Thus, the liquid crystal cell thickness can be treated as a parameter in defining how much energy is transmitted through a grating at a given voltage.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals.

It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways.

At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A scene projector, comprising:
    a first cycloidal diffractive waveplate positioned to receive light from a light source, the first cycloidal diffractive waveplate comprising a plurality of first pixels that are switchable such that optical energy of light from a zero order passes through a first pixel along an optical axis and optical energy of light from plus and minus first orders is deflected away from the optical axis through the first pixel;
    a second cycloidal diffractive waveplate disposed downstream of the light source and the first cycloidal diffractive waveplate, the second cycloidal diffractive waveplate comprising a plurality of second pixels positioned to receive diffracted orders of light from the first cycloidal diffractive waveplate, where there are at least three second pixels for one first pixel, the three second pixels corresponding to each diffracted order received from the one first pixel;
    a first reflective surface positioned to receive diffracted orders of light from the second cycloidal diffractive waveplate; and
    a second reflective surface positioned to receive diffracted orders of light from the second cycloidal diffractive waveplate, where each of the first reflective surface and the second reflective surface direct at least some light received from the second cycloidal diffractive waveplate toward a grating structure.

2. The scene projector of claim 1, where a combination of the first cycloidal diffractive waveplate, the second cycloidal diffractive waveplate, and the grating structure establishes independent control of degree of polarization, angle of linear polarization, and intensity for light output from the scene projector.

3. The scene projector of claim 1, with a polarization state of the plus and minus first orders exiting the first pixel circularly polarized with substantially opposite handedness and substantially equal magnitudes, and with a polarization state of the zero order maintained through the first pixel.

4. The scene projector of claim 1, where the grating structure comprises a third cycloidal diffractive waveplate.

5. The scene projector of claim 4, where the third cycloidal diffractive waveplate performs a combining function for light received from the first reflective surface and the second reflective surface.

6. The scene projector of claim 4, where the third cycloidal diffractive waveplate comprises a single element, polymerized grating with a grating period substantially equal to that of one or more of the first cycloidal diffractive waveplate and the second cycloidal diffractive waveplate.

7. The scene projector of claim 1, where light output from the grating structure comprises a predetermined combination of right circular light, left circular light, and unpolarized light.

8. The scene projector of claim 1, where each of the plurality of first pixels comprises a liquid crystal layer disposed between two substrates, where one or more of the two substrates is coated with a photo-alignment layer adjacent to the liquid crystal layer and coated with transparent electrodes.

9. The scene projector of claim 1, where the first cycloidal diffractive waveplate further comprises inactive pixels in addition to the first pixels, and where there are at least two inactive pixels for every first pixel.

10. The scene projector of claim 1, where at least one of the at least three second pixels is purely transmissive.

11. The scene projector of claim 1, where one or more of the plurality of second pixels is switchable by applying a voltage thereto.

12. The scene projector of claim 1, where the first reflective surface and the second reflective surface are each disposed on a sidewall of the scene projector.

13. The scene projector of claim 1, where the first reflective surface and the second reflective surface are sized and positioned according to diffraction angles of light from one or more of the first cycloidal diffractive waveplate and the second cycloidal diffractive waveplate.

14. The scene projector of claim 1, further comprising one or more baffles positioned to block or absorb undesirable light.

15. The scene projector of claim 14, where the undesirable light is output from one or more of the first cycloidal diffractive waveplate, the second cycloidal diffractive waveplate, and the grating structure, or reflected from one or more of the first reflective surface and the second reflective surface.

16. A method of scene projection, the method comprising:
    receiving light at a first cycloidal diffractive waveplate comprising a plurality of first pixels;
    controlling a first pixel of the plurality of first pixels such that optical energy of light from a zero order passes through the first pixel along an optical axis and optical energy of light from plus and minus first orders is deflected away from the optical axis through the first pixel;
    receiving diffracted orders of light from the first cycloidal diffractive waveplate at a second cycloidal diffractive waveplate, the second cycloidal diffractive waveplate comprising at least three second pixels for one first pixel, the three second pixels corresponding to each diffracted order received from one first pixel; and
    directing at least some light output from the second cycloidal diffractive waveplate toward a grating structure.

17. The method of claim 16, where directing at least some light output from the second cycloidal diffractive waveplate toward the grating structure comprises reflecting light using one or more of a first reflective surface and a second reflective surface.

18. The method of claim 16, where a polarization state of the plus and minus first orders exiting the first pixel is circularly polarized with substantially opposite handedness and substantially equal magnitudes, and with a polarization state of the zero order maintained through the first pixel.

19. The method of claim 16, further comprising independently controlling a degree of polarization, angle of linear polarization, and intensity for light using a combination of the first cycloidal diffractive waveplate, the second cycloidal diffractive waveplate, and the grating structure.

20. A system for scene projection, the system comprising:
a plurality of scene projectors each operating at a different spectrum, each of the plurality of scene projectors comprising:
a first cycloidal diffractive waveplate comprising a plurality of first pixels that are switchable such that optical energy of light from a zero order passes through a first pixel along an optical axis and optical energy of light from plus and minus first orders is deflected away from the optical axis;
a second cycloidal diffractive waveplate disposed downstream of the first cycloidal diffractive waveplate, the second cycloidal diffractive waveplate comprising a plurality of second pixels positioned to receive diffracted orders of light from the first cycloidal diffractive waveplate, where there are at least three second pixels for one first pixel, the three second pixels corresponding to each diffracted order received from one first pixel;
a first reflective surface positioned to receive diffracted orders of light from the second cycloidal diffractive waveplate; and
a second reflective surface positioned to receive diffracted orders of light from the second cycloidal diffractive waveplate, where each of the first reflective surface and the second reflective surface direct at least some light received from the second cycloidal diffractive waveplate toward a grating structure; and
a combining element structurally configured to combine light output from each of the plurality of scene projectors.

\* \* \* \* \*